United States Patent Office.

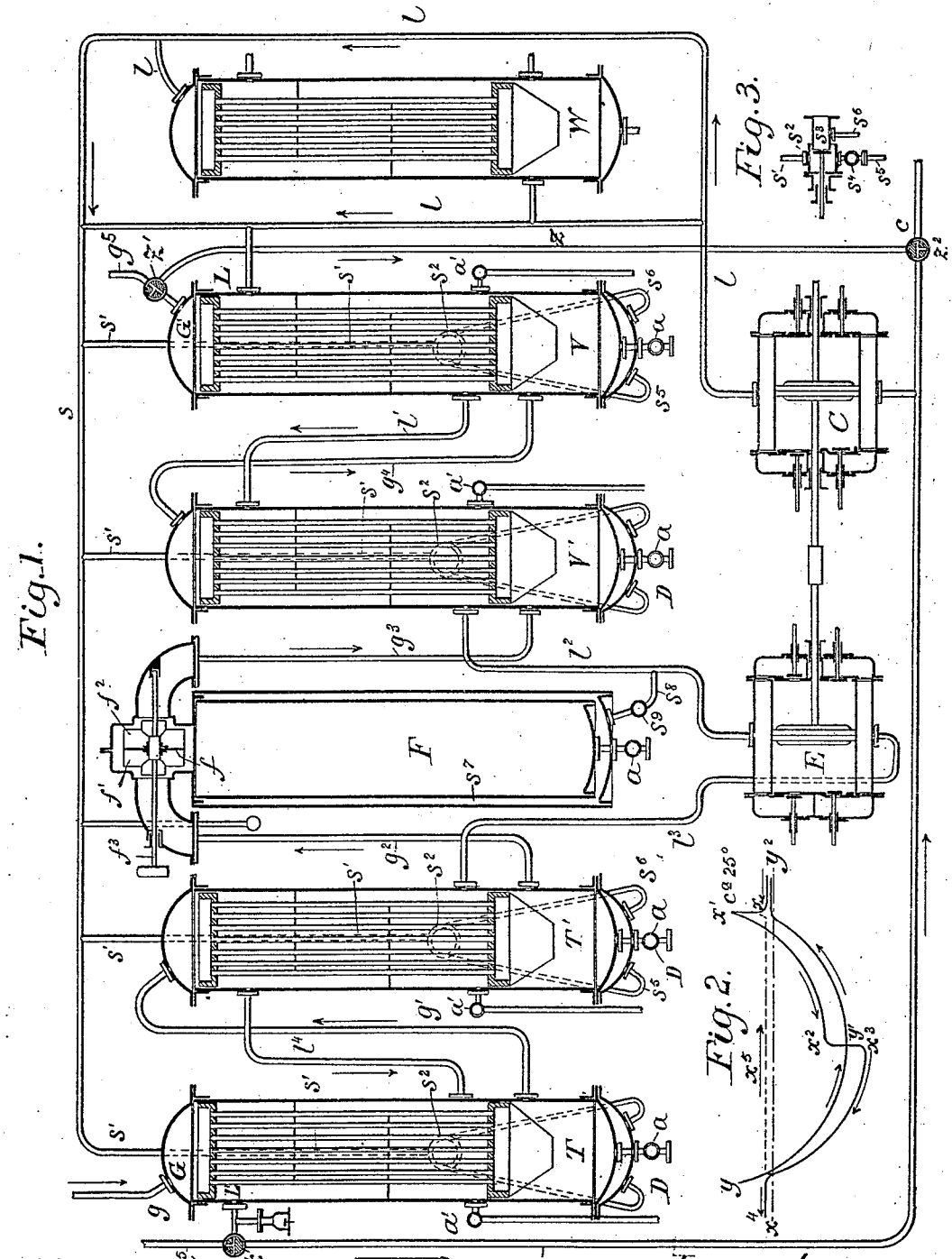

FRANZ WINDHAUSEN, OF BERLIN, GERMANY.

APPARATUS FOR SEPARATING CONSTITUENT PARTS OF GASEOUS AND LIQUID COMPOUNDS.

SPECIFICATION forming part of Letters Patent No. 551,023, dated December 10, 1895.

Application filed December 16, 1892. Serial No. 455,350. (No model.) Patented in Belgium August 3, 1892, No. 100,797.

*To all whom it may concern:*

Be it known that I, FRANZ WINDHAUSEN, a subject of the King of Prussia, Emperor of Germany, residing at No. 106 Rathenowerstrasse, Berlin, N. W., in the Kingdom of Prussia, Germany, have invented a new and useful Improved Apparatus for Separating Constituent Parts of Gaseous and Liquid Compounds—as, for instance, separation of water from liquids containing alcohol or of hydrocarbons or paraffine from gases, &c.—(for which I have obtained a patent in Belgium, No. 100,797, bearing date August 3, 1892,) of which the following is a specification.

The present invention relates to the elimination from gaseous and liquid compounds or mixtures of a certain one or more of their constituent parts; and its object is to effect the same by a cooling process, so that the remaining part, after the separation has taken place, shall be obtained at its original temperature or somewhat warmer. In order to obtain this, a current of gaseous or aeriform body previously rendered intensely cold by successive compression, cooling, and expansion is caused to act on the countercurrent principle as a heat-absorbing agent on the compound to be treated in order to separate therefrom those parts which are capable of being solidified or liquefied at the temperature of the said current, and the part not rendered dense is caused to act as a heat-absorbing agent on the compressed aeriform or gaseous body before the latter is allowed to expand. In this manner that part not rendered dense will be warmed and simultaneously its cold utilized to assist in the production of the intense cold necessary to effect the elimination.

The mode of operation can be carried out in three ways: first, by continually renewing the gaseous or aeriform fluid serving alternately as heat or cold conveying agent; second, by repeatedly employing the same, (in circulation;) third, by employing in the same manner that part of the compound not rendered dense instead of any particular gaseous or aeriform fluid. In the latter case the invention is confined to gaseous or aeriform fluids.

The apparatus consists mainly of one set of refrigerators and one set of reheaters connected together and fitted up on the countercurrent principle; an apparatus arranged between the said two sets in the course of the compound or mixture under treatment and adapted to catch and retain any condensed or solidified particles which the uncondensed portion of the said compound or mixture might carry with it from the set of refrigerators; an expansion-cylinder arranged between the said sets of refrigerators and reheaters and in the course of the fluid serving alternately as heat and cold conveying agent, and a compression-cylinder arranged at the beginning of the latter course, to which the agent in question is fed or conducted and from which it is delivered in compressed and consequently warmed state into the reheating set.

As additional apparatus a cooler with water circulation may be employed, if necessary, the same being arranged after the compression-cylinder in order to cool down the heat or cold conveying agent to the temperature of the water previous to its entering the above-mentioned set of reheaters, and devices for removing solid deposits from the refrigerators and catching device previously mentioned, as also for carrying out the modified mode of operation mentioned under mode second above; a connecting-pipe with valves at both ends between the outlet for the fluid serving alternately as heat and cold conveying agent and the compression-cylinder, so that the said agent can be caused to return to the compression-cylinder instead of being permitted to leave the apparatus, and finally for carrying out the modified method mentioned under mode three above; a connecting-pipe with valves at both ends between the outlet for that part of the gaseous or liquid compound which has not been solidified or condensed and the compression-cylinder, so that the said part can be caused to flow back to the compression-cylinder instead of being permitted to leave the apparatus.

In order to make this specification more clearly intelligible, reference is had to the accompanying drawings, in which similar letters denote similar parts throughout the several views.

Figure 1 illustrates in section one form of the apparatus for carrying out my invention. Fig. 2 is a diagram showing the changes of temperature that take place during the process. Fig. 3 is a section through a device for removing solid deposits from the coolers and reheaters.

Throughout the following description the word "compound" is used to designate the liquid or aeriform body under treatment and the word "medium" for the heat or cold conveying agent.

C is the compression-cylinder.

V V' are the reheaters.

E is the expansion-cylinder, T T' the set of coolers, and W the cooler with water circulation.

The coolers as well as the reheaters are supposed to be constructed on the same principle as the well-known tubular condensers. The circulation-chamber formed by the tubes of the outer or end cooler is provided with an inlet G and the corresponding chamber of the outer or end reheater V with an outlet G' for the compound—that is, for the uncondensed portion of the same—while the chamber inclosing the tubes of the end reheater V' has an inlet L and the corresponding chamber of the cooler T an outlet L' for the medium. The connections for the circulation from inlet G to outlet G' through the tubes for the compound and from the compression-cylinder to outlet L' through the tube-chambers for the medium are formed for the latter by pipe $l$ and cooler W, the tube-inclosing chamber of which may be considered as a portion of the said pipe between the compression-cylinder C and the inlet L, pipe $l'$ between the reheaters V and V', pipes $l^2$ and $l^3$ between reheater V' and cooler T by way of the expansion-cylinder E, and pipe $l^4$ between the coolers T' and T, and for the former by pipe $g'$ between the coolers T and T', pipes $g^2$ and $g^3$ between cooler T' and reheater V by way of the catching device F, and pipe $g^4$ between the reheaters V' and V. If the cooler W is not employed, the pipe I will go directly to the inlet L, as indicated by dotted lines in Fig. 1.

The medium is drawn by suction through pipe $c$ into the compression-cylinder C, where it is compressed, and passes then through pipe $l$ (and if it is to be reduced to water temperature through the tubes of the condenser W) into the set of reheaters V V', through the tubes of which circulates the uncondensed portion of the compound. The said medium here passes between the tubes, where it is cooled, and through pipe $l^3$ into the expansion-cylinder E, which is provided with positive-acting inlet and outlet valves, as in ordinary refrigerating-engines. The medium is here cooled down by expansion to atmospheric pressure and flows then through pipe $l^3$ into the chambers inclosing the tubes of the coolers T' T, whence it escapes through exit-orifice L' and pipe $l^5$. The compound is simultaneously caused to pass into the tubes of the first cooler T through the inlet-pipe $g$—i. e., in direction opposite to the course of the medium—and from said tubes it passes through pipe $g'$ into the tubes of the second cooler T', from whence it passes through the pipe $g^2$ into the apparatus F, which, as above mentioned, serves to catch and detain any solidified or condensed particles carried by the uncondensed portion of the compound from the coolers. On its passage through the said coolers the compound is subjected to the action of the cold which has been produced on the medium by expanding it before it reaches the cooler series and which is the more intense the more the compound approaches the pipe $g^2$, so that such of its constituents as are capable of being solidified or condensed by said cold are caused to separate out, and in doing so collect partly on the walls inside the tubes and partly on the bottom of the coolers. From the apparatus F the uncondensed portion of the compound passes through the pipe $g^3$ into and through the tubes of reheater V', the pipe $g^4$, and the tubes of reheater V, successively, to the exit-orifice G' and pipe $g^5$. On this passage the more the said uncondensed portion of the compound approaches the pipe $g^5$ the more it takes up heat from the compressed medium circulating in the other way, and thus leaves the apparatus in warmed state.

In Fig. 2 the line $x\ x'$ represents the rise of temperature produced in the compressed medium and line $x^2\ x^3$ shows the relative diminution in temperature from the beginning to the end of the expansion. The thermic curve $x\ x'\ x^2\ x^3\ x^4$ corresponds to the variations in the temperature of the medium and the curve $y\ y'\ y^2$ to those of the compound.

If, according to the second method of carrying out the process, the medium is required to circulate continually, communication must be established between the outlet-pipe $l^5$ and the compression-cylinder, as by a pipe $k$, connected with pipe $l^5$ by a three-way cock $k'$, the feed-pipe $c$ being dispensed with in this case. The said cock $k'$ is then first adjusted to close the chamber of the cooler T and open up communication between pipe $l^5$ and the compression-cylinder, thus allowing the medium to flow through the pipes $l^5$ and $k$ to the compression-cylinder and along the way described to exit-orifice L', so as to be able to return to the compression-cylinder after the cock $k'$ has been turned so as to close $l^5$ and open up connection between exit-orifice L' and pipe $k$. As long as the cock $k'$ is left in this latter position, the medium will continue to circulate round and round. The course of the compound is the same as previously described. The variations in the temperature of the medium correspond to the closed curve $x\ x'\ x^2\ x^3\ x^4\ x^5\ x$.

If it is desired, in the case of an aeriform compound, to cause that part of the compound not solidified to act as medium, the exit-pipe $g^5$ must be connected to the compression-cylinder, for instance, by a pipe $z$ and a three-way cock $z'$. The compound entering through orifice G takes its course through the tubes of cooler T, pipe $g'$, tubes of cooler T', pipe $g^2$, catching device F, pipe $g^3$, tubes of reheater V', pipe $g^4$, tubes of reheater V, exit-orifice G, cock $z'$ into compression-cylinder C, from whence it flows by way of the pipe $l$ and, if desired, the cooler W to inlet-orifice L, and now traverses the apparatus in opposite direction by passing through tube-inclosing chamber of reheater V, pipe $l'$, tube-inclosing chamber of reheater V', pipe $l^2$, expansion-cylinder E, pipe $l^3$, tube-inclosing chamber of cooler T', pipe $l^4$, and tube-inclosing chamber of cooler T to exit-orifice L' and out of the apparatus through pipe $l^5$. The successive thermic variations of the aeriform fluid will correspond to the curve $y\ y'\ y^2\ x\ x'\ x^2\ x^3\ x^4$.

If the apparatus is to be adapted for working in any of the various ways hereinbefore described, the pipe connection $z$ between feed-pipe $c$ and outlet-pipe $g^5$ must be provided with two three-way cocks $z'$ and $z^2$.

In carrying out the process according to the manner at first described the various cocks must be adjusted as shown in Fig. 1. In the second case cock $k'$ will be adjusted as described and cocks $z'$ and $z^2$ as shown in the drawing Fig. 1. In the third case, however, cock $k'$ will be adjusted as in Fig. 1 and cocks $z'\ z^2$ so as to open up communication between exit-orifice G' and feed-pipe $c$.

That part of the compound which undergoes solidification or liquefaction will be deposited partly in the cooler-tubes and partly on the bottoms of the coolers, while any solidified or liquefied particles held in suspension in the current will be detained by the apparatus F. The latter consists of a vertically-arranged receptacle having at its upper end between the inlet and outlet orifices a circular disk $f$, mounted on a spindle $f^3$, said disk having on its sides wings $f'\ f^2$. If the spindle $f^3$ be rotated, the wings $f'$ will drive all the solidified or liquefied particles of the compound into the receptacle F, while wings $f^2$ will drive down any parts which may have got past the wings $f'$, without perceptibly stopping the course of the gaseous particles.

To enable liquid deposits to be drawn off, the receptacle F is provided with a cock $a$, and the coolers, the reheaters, and the tube-inclosing chambers thereof are provided with cocks $a\ a'$. In order to remove solid deposits, the same are thawed, by aid of the device shown in section in Fig. 3. Each cooler and reheater is provided with a double bottom D, and this latter is connected by a pipe $s^5$ and cock $s^4$ to the front chamber of a box $s^2$, divided by a partition-wall, the back chamber of said box opening into the tube-chamber of the cooler or reheater on one hand and communicating on the other hand by means of a tube $s^6$ with the double bottom. The box $s^2$ is connected by a pipe $s'$ with a pipe $s$, branched off from the pipe $l$. The said partition-wall may, as shown, be constituted by a valve $s^3$ in order to permit the thawing agent to be led directly into the tube-inclosing chamber, the cock $s^4$ being closed. If now the cock $s^4$ is opened, the warm medium enters the double bottom D through pipes $s\ s'$ and box $s^2$ and passes through pipe $s^6$ into the tube-inclosing chamber, while the deposits thus thawed are drawn off by the cock $a$ or $a'$.

In order to thaw the solidified deposits in the apparatus F, the same is provided with an exterior shell forming a space $s^7$ between the outer and inner shells, which space is connected at the bottom by a pipe $s^8$ and cock $s^9$ to the pipe $l^2$, leading to the expansion-cylinder, so that by opening said cock part of the medium is led into the said space before being subjected to expansion.

The arrangement of two coolers and two reheaters, as shown in the drawings, only serves as an example, the number of coolers and reheaters employed depending entirely on the nature of the compound. Tubular coils or spirals may also be used in the coolers instead of the straight tubes described, provided that with sufficient tubular surface the counter-current principle is retained.

The invention is particularly adaptable for concentrating and sterilizing liquids containing alcohol by freezing out a part of the water contained in the same, as also for gases containing hydrocarbons or paraffin for condensing and separating out such parts of the same as are capable of condensation.

I claim as my invention—

1. In apparatus for separating out constituent parts of a liquid or aeriform compound by the action of a gaseous or aeriform cooling medium, the said compound and medium being caused to meet each other on the countercurrent principle, the combination of reheaters V V' and coolers T T', a compression cylinder C and expansion cylinder E, pipe connections for the passage of the compound to be treated through the tubes of said coolers and through the tubes of the reheaters successively, pipe connections for the passage of the cooling medium from the compression cylinder through the tube inclosing spaces of the reheaters, thence through the expansion cylinder, and from the latter to the tube inclosing spaces of the coolers, and suitable inlets and outlets to the reheaters and coolers for the said compound and medium, substantially as described.

2. In apparatus for separating out constituent parts of a liquid or aeriform compound by the action of a gaseous or aeriform cooling medium, the said compound and medium being caused to meet each other on the countercurrent principle, the combination with the reheaters and coolers, compression cylinder, expansion cylinder, pipe connections arranged as specified, and suitable inlets and outlets to the reheaters and coolers for the said compound and medium, of an additional cooler W arranged in the pipe connection between the compression cylinder and the reheater set, substantially as described.

3. In apparatus for separating out constituent parts of a liquid or aeriform compound by the action of a gaseous or aeriform cooling medium, the said compound and medium being caused to meet each other on the counter-current principle, the combination with the reheaters and coolers, compression cylinder, expansion cylinder, pipe connections arranged as specified and suitable inlets and outlets to the reheaters and coolers for the said compound and medium, of a device for catching or retaining solidified or liquefied particles of the said compound and arranged in the pipe connection between the tube inclosing spaces of the cooler and reheater sets, substantially as described.

4. In apparatus for separating out constituent parts of a liquid or aeriform compound by the action of a gaseous or aeriform cooling medium, the said compound and medium being caused to meet each other on the counter-current principle, the combination, with the reheaters and coolers, compression cylinder, expansion cylinder, pipe connections arranged as specified, and suitable inlets and outlets to the reheaters and coolers for the said compound and medium, of an additional cooler W placed in the pipe connection between the compression cylinder and the reheater set, and a device for catching or retaining solidified or liquefied particles of the said compound and arranged in the pipe connection between the tube inclosing spaces of the cooler and reheater sets, substantially as described.

5. In apparatus for separating out constituent parts of a liquid or aeriform compound by the action of a gaseous or aeriform cooling medium, the said compound and medium being caused to meet each other on the counter-current principle, the combination with the reheaters and coolers, compression cylinder, expansion cylinder, pipe connections arranged as specified, and suitable inlets and outlets to the reheaters and coolers for the said compound and medium, of a pipe connection $k$ with cock $k'$ from the outlet $L'$ of the cooling medium at the end of the cooler set back to the compression cylinder, substantially as described.

6. In apparatus for separating out constituent parts of a liquid or aeriform compound by the action of a gaseous or aeriform cooling medium, the said compound and medium being caused to meet each other on the counter-current principle, the combination with the reheaters and coolers, compression cylinder, expansion cylinder, pipe connections arranged as specified, and suitable inlets and outlets to the reheaters and coolers for the said compound and medium, of a pipe connection $k$ with cock $k'$ from the outlet $L'$ for the cooling medium at the end of the cooler set back to the compression cylinder, and a pipe connection $z$ with cock $z'$, $z^3$ between the outlet $G'$ for the uncondensed portion of the said compound and the inlet of the cooling medium to the compression cylinder, substantially as described.

7. In apparatus for separating out constituent parts of a liquid or aeriform compound by the action of a gaseous or aeriform cooling medium, the said compound and medium being caused to meet each other on the counter-current principle, the combination of the reheaters and coolers, compression cylinder, expansion cylinder, and pipe connections arranged as specified, said reheaters and coolers having double bottoms D and having a device consisting of a front box $s^2$ or compartment, and rear box $s^3$, open connection between the latter and the tube inclosing space of its respective cooler, a stop valve between front and rear boxes, a pipe connection $s^5$ having stop cock $s^4$ from front compartment $s^2$ to double bottom, pipe connection $s'$ from said front compartment to a branch pipe $s$ of pipe $l$, and pipe connection $s^6$ from the rear compartment to the double bottom, substantially as described.

In testimony whereof I have hereunto set my hand in the presence of two subscribing witnesses.

FRANZ WINDHAUSEN.

Witnesses:
W. HAUPT,
D. LANZ.